(12) United States Patent
Mayer et al.

(10) Patent No.: US 10,286,890 B2
(45) Date of Patent: May 14, 2019

(54) WAKE-UP DEVICE FOR A BRAKE SYSTEM COMPONENT OF A VEHICLE AND METHOD FOR EXCITING AT LEAST ONE BRAKE SYSTEM COMPONENT OF A VEHICLE

(71) Applicant: ROBERT BOSCH GMBH, Stuttgart (DE)

(72) Inventors: Jochen Mayer, Giengen an der Brenz (DE); Joerg Riethmueller, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 877 days.

(21) Appl. No.: 14/354,309

(22) PCT Filed: Oct. 15, 2012

(86) PCT No.: PCT/EP2012/070360
§ 371 (c)(1),
(2) Date: Apr. 25, 2014

(87) PCT Pub. No.: WO2013/087252
PCT Pub. Date: Jun. 20, 2013

(65) Prior Publication Data
US 2015/0035375 A1    Feb. 5, 2015

(30) Foreign Application Priority Data

Dec. 13, 2011    (DE) .................... 10 2011 088 350

(51) Int. Cl.
*B60T 13/66* (2006.01)
*B60T 13/74* (2006.01)
(Continued)

(52) U.S. Cl.
CPC ............ *B60T 17/22* (2013.01); *B60T 13/662* (2013.01); *B60T 13/745* (2013.01)

(58) Field of Classification Search
CPC ...... B62D 15/021; G01D 5/145; B60T 17/22; B60T 17/18; B60T 13/662; B60T 13/745;
(Continued)

(56) References Cited

U.S. PATENT DOCUMENTS

2005/0067886 A1* 3/2005 Nilsson ............... B60T 8/885
                                                          303/20
2007/0225890 A1* 9/2007 Ringlstetter ........... B60T 7/085
                                                          701/70
(Continued)

FOREIGN PATENT DOCUMENTS

CN    200948788 Y    9/2007
DE    101 23 730 A1   3/2002
(Continued)

OTHER PUBLICATIONS

International Search Report, PCT International Application No. PCT/EP2012/070360, dated May 7, 2013.

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A wake-up device for a brake system component of a vehicle includes a magnet that is arranged to be set, via a transmission device, in rotational motion jointly with a shifting of a driver brake force transmission component, thereby effecting a relative motion between the magnet and an electrical conductor. The relative motion induces an induction voltage. An output device outputs the induction voltage or a wake-up signal generated based on the induction voltage to the brake system component, thereby controlling the brake system component to transition from a first energy use mode to a second energy use mode. A method includes controlling the brake system component to transition from the first energy use mode to the second energy use mode by outputting the induction voltage or wake-up signal generated as described above.

15 Claims, 4 Drawing Sheets

(51) Int. Cl.
*B60T 17/22* (2006.01)
*H01F 38/14* (2006.01)

(58) Field of Classification Search
CPC .......... B60T 13/74; B60T 13/66; B60T 7/042;
B60T 7/107; B60T 7/12
USPC .......................................................... 303/20
See application file for complete search history.

(56) References Cited

U.S. PATENT DOCUMENTS

| | | | |
|---|---|---|---|
| 2008/0015761 A1* | 1/2008 | Bellego | B60T 13/74 |
| | | | 701/70 |
| 2008/0079375 A1* | 4/2008 | Seguchi | H02K 21/042 |
| | | | 318/139 |
| 2008/0091326 A1* | 4/2008 | Watanabe | B60T 13/741 |
| | | | 701/70 |
| 2011/0073419 A1* | 3/2011 | Matsuzaki | B60T 7/042 |
| | | | 188/106 P |
| 2012/0053803 A1* | 3/2012 | Ueno | B60T 8/1708 |
| | | | 701/70 |

FOREIGN PATENT DOCUMENTS

| | | |
|---|---|---|
| DE | 10 2008 064049 A1 | 1/2010 |
| EP | 2 037 221 A2 | 3/2009 |
| JP | 2004504986 A | 2/2004 |
| JP | 2004153924 A | 5/2004 |
| JP | 2010504606 A | 5/2010 |
| JP | 2010514606 A | 5/2010 |
| KR | 20070022316 A | 2/2007 |
| WO | WO 2005/113306 A1 | 12/2005 |

\* cited by examiner

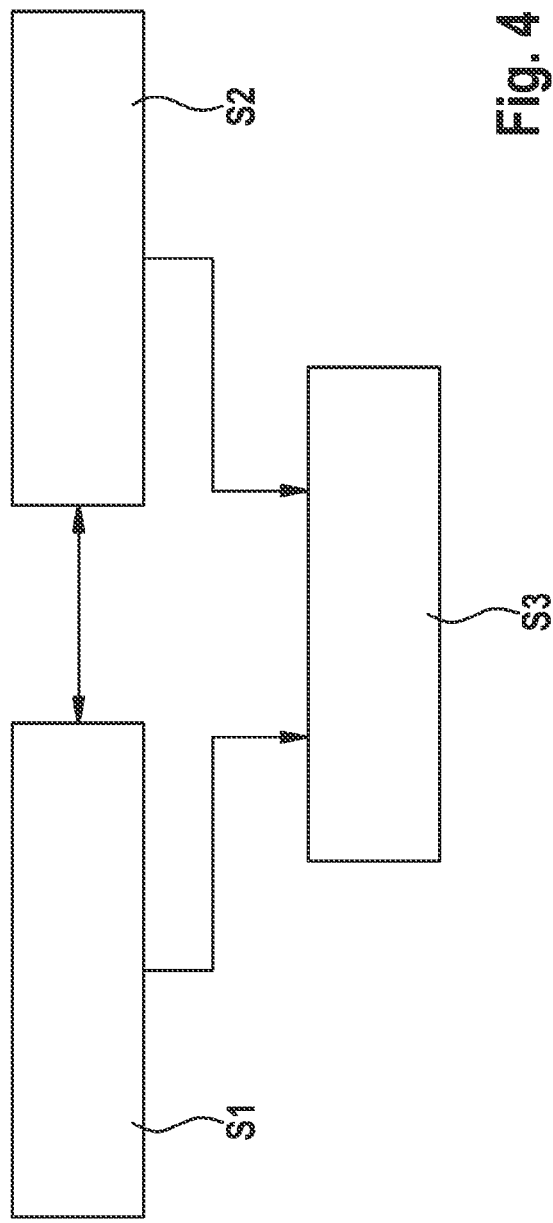

WAKE-UP DEVICE FOR A BRAKE SYSTEM COMPONENT OF A VEHICLE AND METHOD FOR EXCITING AT LEAST ONE BRAKE SYSTEM COMPONENT OF A VEHICLE

FIELD OF THE INVENTION

The present invention relates to a wake-up device for a brake system component of a vehicle, a method for exciting at least one brake system component of a vehicle, a brake booster device for a braking system of a vehicle, a power brake unit for a braking system of a vehicle.

BACKGROUND

In German document DE 101 23 730 A1, a system, a position sensor, and a receiving device are described for the reliable transmission of the position of an operating element. The system has a wake-up device which is designed to detect a signal admissible for wake-up in a sensor channel, and subsequently to control additional components to go from a sleep mode to a fully activated operating mode. The signal admissible for the wake-up is induced in the sensor channel via at least one magnet situated linearly on a pedal and being displaceable with it.

SUMMARY

Example embodiments of the present invention provide an apparatus configured for inducing an induced voltage or a corresponding induced current, where the induced voltage or current is usable for exciting at least one brake system component. For example, the apparatus includes a magnet situated in such a way that the magnet is able to be put in a rotational motion by a joint shifting with a shiftable driver brake force transmission component. Consequently, for the inducing of the induced voltage, magnets may also be drawn upon which, via a transmission device, are already arranged in a jointly shiftable manner with a driver brake force transmission component. The present invention thus implements a wake-up device which is able to use as the magnet a magnet that is already being used conventionally for another function. Because of the multifunctionality of the magnet that is implementable in this fashion, one may do without a magnet used exclusively for the wake-up device, which results in saving on installation space and reducing costs for equipping a vehicle with a braking system that carries out a wake-up function.

The present invention also enables developing a wake-up function on a braking system not including a brake light switch. The brake light switch in a brake system is frequently saved by using an electromechanical brake booster. Consequently, the brake light switch saved in this case cannot be used for activating the present braking system. Using the present invention, however, even in this case, the induction voltage or the wake-up signal may be provided to the at least one brake system component for the wake-up. The electromechanical brake booster may also be excited in this manner. This is also ensured if all internal sensors are present in a deactivated mode/passively, and are not designed to generate an activating signal/wake-up signal.

The present invention enables the switching-on/wake-up of at least one brake system component, such as a brake booster, by an induction signal/wake-up signal generated during the operation of a brake operating component, such as a brake pedal. Thus, the at least one brake system component, that was previously present in a passive state, is able to be converted to an active state in a simple manner and reliably by operating the brake system component. In particular, because of the invention discussed here, a switching-on/wake-up of the at least one brake system component is possible by an internal, inductively generated signal, without requiring the one of the internal sensors to be actively present or use up current.

In a first energy use mode, the brake system component is set at a first energy use which deviates from a second energy use of the brake system component in a second energy use mode. For instance, in the first energy use mode a different number of subunits of the brake system component may be activated than in the second energy use mode. By the first energy use or the second energy use, one may understand the energy used, averaged over time of the brake system component controlled in the first energy use mode or in the second energy use mode.

The at least one brake system component is advantageously able to be controlled using the induction voltage or the wake-up signal from a first energy use mode with a first energy consumption to a second energy use mode with a second energy consumption that is greater than the first energy consumption. In particular, the at least one brake system component is able to be controlled using the induction voltage or the wake-up signal from a deactivated/sleeping mode as the first energy use mode into an activated/fully active mode as the second energy use mode.

In one advantageous specific example embodiment, the magnet is a permanent magnet of an electric motor of a brake booster device and/or a permanent magnet of a rotor position sensor. For example, according to this embodiment, because of operation of a brake operating element (e.g., a brake pedal), the electric motor or the rotor position sensor is able to be used as a generator, in order to use a voltage pulse generated in the process as an activating pulse for switching on the at least one brake system component.

For example, the magnet may be able to be situated such that it is jointly shiftable with a driver brake force transmission component that is shiftable using the transmission device on an input rod, via which a driver brake force exerted on the brake operating element is able to be transmittable to at least one shiftable piston of a main brake cylinder.

Thus, a magnet frequently already connected via a transmission device to the input rod may be used as the magnet for switching on the at least one brake system component. This has the effect that a magnet designated for use as a wake-up unit is not required.

In a further advantageous specific example embodiment, using the induction voltage or the wake-up signal, the brake booster device, an Antilock Braking System (ABS) device, an Electronic Stability Program (ESP) device, a plunger device, an electrical power steering system, a Controller Area Network (CAN) network and/or a boost network are controllable, as the at least one brake system component, to go from the first energy use mode into the second energy use mode. The wake-up device according to the present invention may thus be utilized for a plurality of brake system components.

In one cost-effective specific example embodiment, the electrical conductor includes at least one actuating line of the brake booster device. The electrical conductor may also include at least one stationary coil of the rotor position sensor. Thus, components conventionally already present in a brake system may be utilized for the electrical conductor.

The advantages described in the above paragraphs are also ensured for a brake booster device including a corresponding wake-up device.

In addition, the advantages named are implemented in the case of a power brake unit including such a wake-up device and a shiftable driver brake force transmission component on which the magnet of the wake-up device is situated, using the transmission device, in such a way, in a jointly shiftable manner, that the magnet is able to be put into a rotational motion by the joint shifting with the shiftable driver brake force transmission component.

In addition, the advantages may be implemented using a braking system including such a wake-up device, a corresponding brake booster device, or a correspondingly developed power brake unit.

Moreover, a corresponding method for the wake-up of at least one braking system component of a vehicle also provides the effect of the advantages described above.

Additional features and advantages of the present invention are elucidated below, with reference to the figures.

BRIEF DESCRIPTION OF THE DRAWINGS

FIG. 4 is a flow chart illustrating a method for exciting a brake system component of a vehicle according to an example embodiment of the present invention.

DETAILED DESCRIPTION

Figure 1:
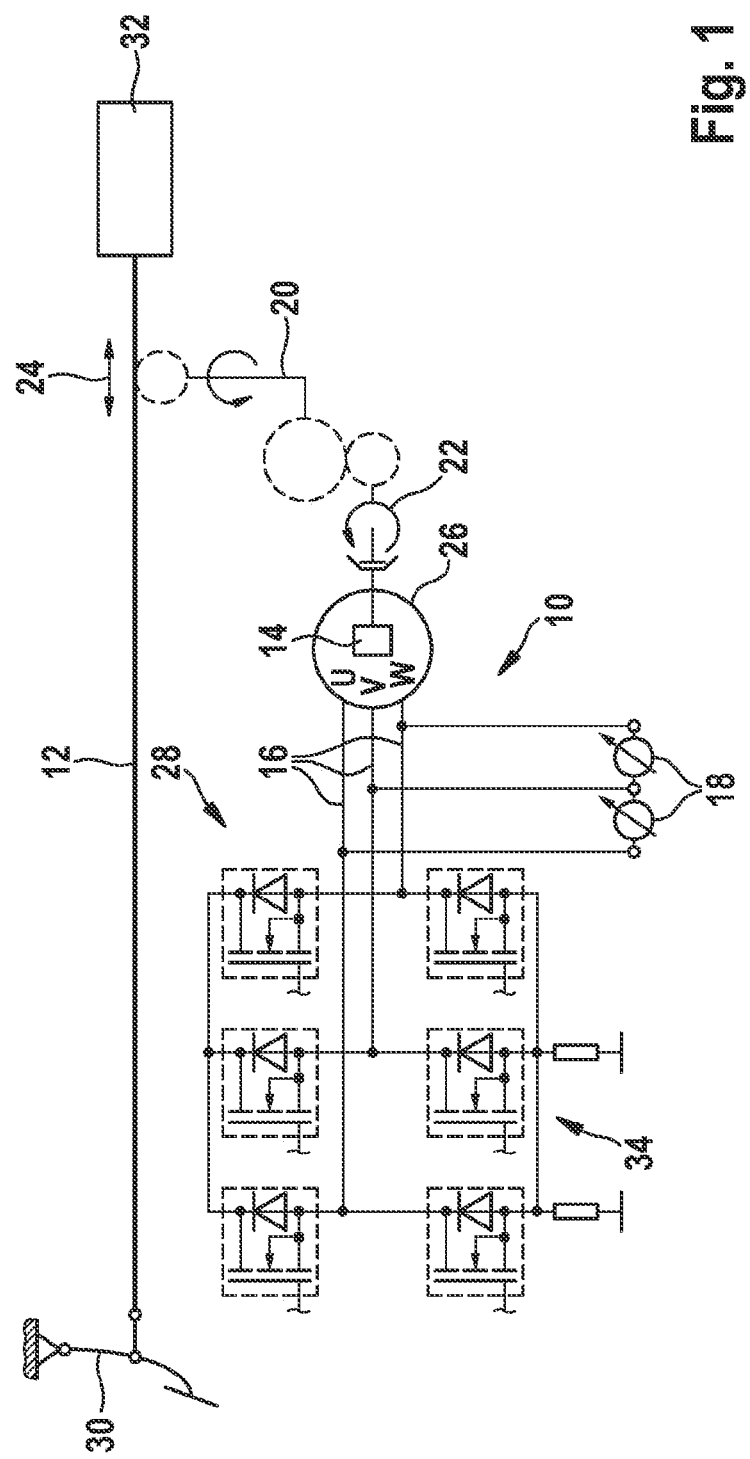
FIG. 1 illustrates a schematic representation of a wake-up device according to a first example embodiment of the present invention.

FIG. 1 illustrates a schematic representation of a wake-up device according to a first example embodiment of the present invention.

Wake-up device 10 shown schematically in FIG. 1 includes a magnet 14 situated in a jointly shiftable manner on a shiftable driver brake force transmission component 12 of a brake system of the vehicle. In addition, wake-up device 10 includes at least one electrical conductor 16, in which an induction voltage is inducible in response to a relative motion between magnet 14 and the at least one electrical conductor 16, by the shifting of magnet 14 situated on driver brake force transmission component 12. In other words, by the joint shifting of magnet 14 together with driver brake force transmission component 12, the former is moved relative to the at least one (stationary) electrical conductor 16, thereby inducing the induction voltage.

Wake-up device 10 also includes an output device 18, using which the induced induction voltage or a wake-up signal generated while taking into account the induction voltage is able to be output at at least one brake system component of the brake system. This is able to be carried out in such a way that the at least one brake system component, using the induction voltage or the wake-up signal, is able to be controlled from a first energy use mode to a second energy use mode that deviates from the first energy use mode.

The at least one brake system component is advantageously able to be controlled, using the induction voltage or the wake-up signal, from the first energy use mode with a first energy consumption to the second energy use mode with a second energy consumption that is greater than the first energy consumption. In particular, the at least one brake system component is able to be controlled, using the induction voltage or the wake-up signal, to transition from a deactivated/sleeping mode as the first energy use mode into an activated/fully active mode as the second energy use mode.

Magnet 14 is mechanically coupled, via a transmission device 20, to driver brake force transmission component 12, such that the magnet is able to be put into a rotational motion 22 by joint shifting with the driver brake force transmission component 12. In an example embodiment, transmission device 20 is designed to translate a linear motion 24 of driver brake force transmission component 12 into rotational motion 22 of magnet 14. For example, transmission device 20 can be a transmission. However, the transmission device 20 is not limited to one certain type of a transmission or a transmission-like device.

For wake-up device 10, a magnet 14 is able to be used which is connected to driver brake force transmission component 12 via a linear motion-rotational motion translational element as transmission device 20. Conventionally, at least one magnet 14 is frequently connected in this way to driver brake force transmission component 12. As a result, a magnet 14 that is already present/being used in a brake system may be used to implement wake-up device 10. In such a case, magnet 14 used for wake-up device 10 is additionally still able to fulfill its other usual function. Because of the implemented multifunctionality of magnet 14 in the case of wake-up device 10, a cost-effective and/or installation space-saving equipping of a brake system is able to be made using the wake-up device.

For instance, magnet 14 can be a permanent magnet of an electric motor 26 of a brake booster device 28. A permanent magnet of an electric motor 26, such as a Permanent Magnet Synchronous Machine (PSM) motor, is often connected via a transmission device 20 to a driver brake force transmission component 12 such that an additional braking support force is exertable on driver brake force transmission component 12 using electric motor 26. At the same time, as a rule, it is assured that magnet 14 of electric motor 26, during the shifting of driver brake force transmission component 12, is automatically jointly put into rotational motion 22, at least using the driver brake force. The specific embodiment described in this instance is thus able to be developed in a simple manner on a brake system.

Driver brake force transmission component 12 may be an input rod, for example, and, in an example embodiment, magnet 14 is coupled to the input rod via transmission device 20, such that magnet 14 is put in rotational motion 22 by linear motion 24 of driver brake force transmission component 12 provided as the input rod. The driver brake force transmission component 12, in an example embodiment, is a component via which a driver braking force exerted upon a brake operating element 30 is able to be transferred to at least one shiftable piston of a main brake cylinder 32 of the brake system. Brake operating element 30 may be a brake pedal, for instance. However, the wake-up device is not restricted to a magnet 14 that is able to be situated on an input rod.

The at least one electrical conductor 16 can include at least one actuating line of brake booster device 28. Consequently, a component that is already frequently present in a control electronics system 34 of brake booster device 28 is able to be utilized for the at least one electrical conductor 16.

However, another arrangement of the at least one electrical conductor 16 is also possible.

The specific embodiment shown schematically in FIG. 1 thus implements an electromechanical brake booster, into which wake-up device 10 is integrated. In the example embodiment, an operation of brake operating element 30 by the driver drives the drive that is in contact with it, including the input rod provided as driver brake force transmission component 12. Magnet 14 connected to the drive via transmission device 20 is put into rotational motion 22 and, as a generator, induces the induction voltage in the at least one electrical conductor 16, that is also able to be used as an actuating line. Output device 18 is able to detect the induction voltage at the motor terminals as a voltage pulse, for example, and, using this voltage pulse as wake-up signal, is able to control at least one brake system component to transition from the first energy use mode to the second energy use mode, i.e., waking up the at least one brake system component.

Examples of the at least one brake system component which are controllable to transition from the deactivated mode into the activated mode include brake booster device 28, an ABS device, an ESP device, a plunger device, an electrical power steering system, a CAN network, and/or a boost network. In addition to the brake system components enumerated here, a further brake system component may also be controllable/excitable using the signal emitted by output device 18.

Figure 2:
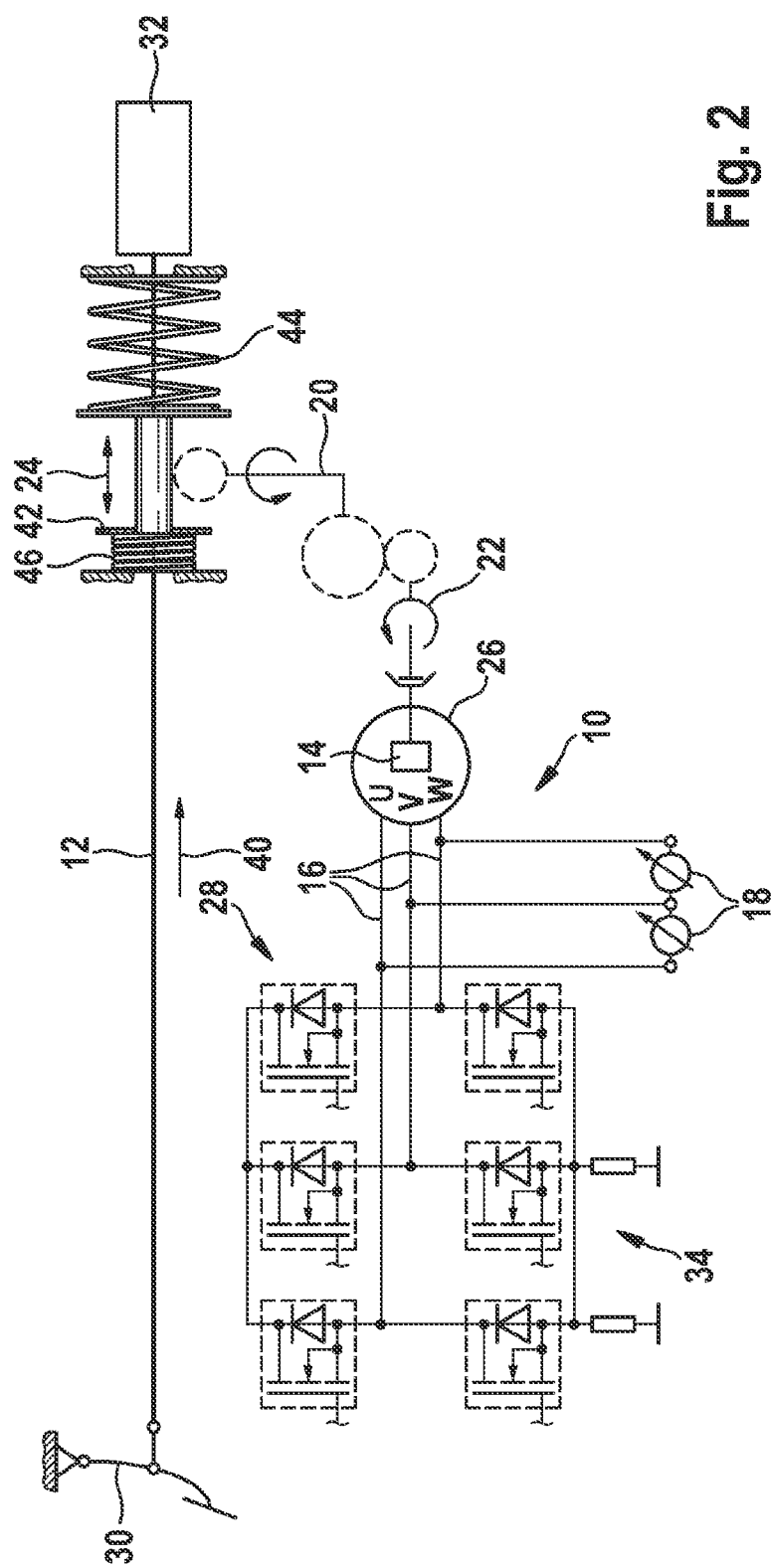
FIG. 2 illustrates a schematic representation of a wake-up device according to a second example embodiment of the present invention.

FIG. 2 shows a schematic representation of a second example embodiment of the wake-up device.

In the example embodiment of FIG. 2, magnet 14 of wake-up device 10, which is arranged as a permanent magnet of electric motor 26 of brake booster device 28, is situated relative to a shiftable driver brake force transmission component 12, provided as an input rod, such that magnet 14 of wake-up device 10 is able to be jointly shiftable with driver brake force transmission component 12, using transmission device 20. In this context, it is ensured that magnet 14 is able to be put into rotational motion 22 by the joint shifting with shiftable driver brake force transmission component 12. In this way, a brake system is able to be implemented including at least wake-up device 10 and shiftable driver brake force transmission component 12, such that the advantages, already mentioned above, are ensured.

The advantages described above also come into effect in the embodiment shown in FIG. 2, although the drive including driver brake force transmission component 12, designed as an input rod, is only able to act supportively in one braking direction 40 as the operating direction. Consequently, the advantageous technology may also be used for a brake system whose input rod is guided between brake operating element 30 and main brake cylinder 32 coaxially or non-coaxially through a sleeve 42 that is shiftable. Displacing the input rod in braking direction 40, i.e., from brake operating element 30 towards main brake cylinder 32, brings about a shifting motion of jointly shiftable sleeve 42 to main brake cylinder 32, whereby a return spring 44, which is situated at the same side of the sleeve as main brake cylinder 32, is compressed. (Using return spring 44, brake operating element 30 may be reset again to its initial position, after an operation by the driver.)

An elastic stop 46 is arranged at a side of sleeve 42 facing away from return spring 44. An operation of brake operating element 30 by the driver, by which return spring 44 is compressed, operates main brake cylinder 32, unstresses elastic stop 46, and moves sleeve 42 in braking direction 40. This motion of sleeve 42 in braking direction 40 effects rotational motion 22 of magnet 14, by which the induction voltage is induced in the at least one conductor 16, which is able to be ascertained/provided as a generator voltage pulse at the motor terminals. Thereafter, the voltage pulse can be used as a wake-up signal for activating at least one brake system component. Consequently, even at an inactivated brake booster device 28, the wake-up signal is able to be generated reliably by the generator operation of magnet 14, which is in connection with the drive.

Figure 3:
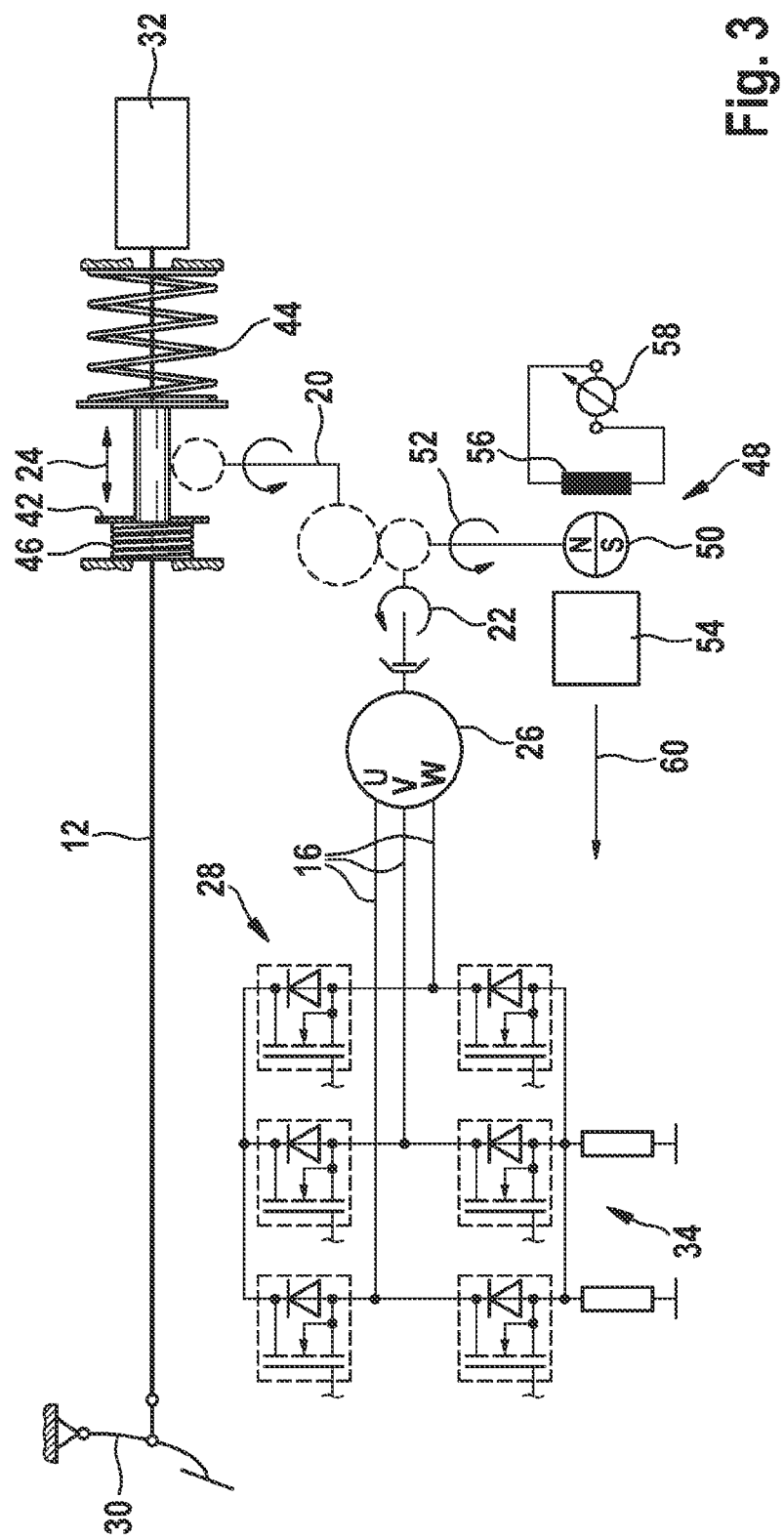
FIG. 3 illustrates a schematic representation of a wake-up device according to a third example embodiment of the present invention.

FIG. 3 shows a schematic representation of a third example embodiment of the wake-up device.

In wake-up device 48 shown schematically in FIG. 3, a magnet 50 of a sensor is used for generating/inducing the induction voltage/the wake-up signal.

Magnet 50 can be a permanent magnet. In an example embodiment, magnet 50 is a permanent magnet of a rotor position sensor 54. Rotor position sensor 54 is preferably a contactless sensor including a permanent magnet used as magnet 50. However, the design of a magnet 50 is not limited to the examples listed here.

Magnet 50 is coupled via transmission device 20 to driver brake force transmission component 12, such that magnet 50 is able to be put into a rotational motion 52 by linear movement of driver brake force transmission component 12. An electric conductor in which, using magnet 50 set into rotational motion 52, the induction voltage is inducible, includes at least one stationary coil 56 of rotor position sensor 54. Output device 58 is an electronic system that is electrically connected to the at least one coil 56. Even if an additional coil must be situated on rotor position sensor 54 for the electrical conductor, this may be carried out comparatively cheaply.

Advantageous wake-up device 48 is thus also able to be integrated into a rotor position sensor 54. The advantages already mentioned above are able to be reliably implemented in this case, too.

Rotor position sensor 54 may be a subunit of brake booster device 28. A brake booster device 28 including an (electrically commutated) motor 26, in particular, frequently includes a rotor position sensor 54, which reports to an electronic system the position of a rotor of motor 26 for a commutation. Consequently, for the integration of wake-up device 48, a sensor system can be used that is often already present on brake booster device 28. In this case, rotor position sensor 54 can be used both as wake-up device 48 and as a sensor for ascertaining and outputting information 60 with regard to a position of the rotor of motor 26. Because of this multifunctionality of rotor position sensor 54, manufacturing costs may be saved and the need for installation space of wake-up device 48 may be limited.

FIG. 4 is a flow chart for explaining an example embodiment of the method for exciting at least one brake system component of a vehicle.

In a method step S1, a magnet is provided that is arranged to be jointly shiftable with a shiftable driver brake force transmission component of a brake system of the vehicle. The providing of the magnet includes arranging the magnet such that, with the assistance of a transmission device, a (preferably linear) shift of driver brake force transmission component causes a joint rotational motion of the magnet.

In a method step S2 (that is to be carried out simultaneously, before, or subsequent to step S1), at least one electrical conductor is arranged such that, in response to the relative motion between the magnet and the electrical conductor, effected by the joint shifting of the magnet with the shift of the driver brake force transmission component, an induction voltage is induced in the at least one electrical conductor.

Furthermore, in a method step S3, the induced induction voltage or a wake-up signal generated based on the induction voltage, is output to the at least one brake system component (e.g., to a processor or a circuit of the at least one brake system component), thereby controlling the at least one brake system component to transition from a first energy use mode to a second energy use mode that deviates from the first energy use mode. In order to generate the wake-up signal, the induction voltage can be converted to the wake-up signal.

The advantageous method described above enables the use of a magnet of an electric motor or of a sensor for the wake-up device. For instance, a permanent magnet of an electric motor of a brake booster device and/or a permanent magnet of a rotor position sensor of the brake booster device can be used as the magnet.

What is claimed is:

1. A brake system of a vehicle, the brake system comprising:
    a brake booster;
    a motor that includes a rotor;
    a rotor position sensor that includes:
        a magnet by which the rotor position sensor is configured to detect a position of the rotor, wherein the rotor position sensor is configured to output an indication of the rotor position detected using the magnet; and
        a stationary coil, wherein the rotor of the motor is configured to drive the brake booster without being influenced by the magnet and without being influenced by the stationary coil;
    a transmission device arranged to, whenever a shiftable driver brake force transmission component is shifted linearly, cause the magnet to rotate, thereby inducing an induction voltage to be generated in the stationary coil in response to a relative motion between the magnet and the stationary coil due to the rotation of the magnet; and
    an output device that is configured to output, to a brake system component, the induction voltage or a wake-up signal generated based on the induction voltage, thereby controlling the brake system component to transition from a first energy use mode to a second energy use mode that deviates from the first energy use mode.

2. The brake system of claim 1, wherein an energy consumption of the brake system component is greater in the second energy use mode than in the first energy use mode.

3. The brake system of claim 1, wherein the brake system component is in a deactivated state in the first energy use mode and in an activated state in the second energy use mode.

4. The brake system of claim 1, wherein the magnet is a permanent magnet of the rotor position sensor.

5. The brake system of claim 1, wherein the shiftable driver brake force transmission component is an input rod, via which a driver brake force exerted on a brake operating element is transmittable to at least one shiftable piston of a main brake cylinder.

6. The brake system of claim 1, wherein the brake system component includes an Antilock Braking System (ABS) device.

7. A power brake unit for a brake system of a vehicle, comprising:
    a shiftable driver brake force transmission component;
    a brake booster;
    a motor that includes a rotor; and
    a wake-up device for a brake system component of the vehicle, the wake-up device including:
        a rotor position sensor that includes:
            a magnet by which the rotor position sensor is configured to detect a position of the rotor, wherein the rotor position sensor is configured to output an indication of the rotor position detected using the magnet; and
            a stationary coil, wherein the rotor of the motor is configured to drive the brake booster without being influenced by the magnet and without being influenced by the stationary coil;
        a transmission device arranged to, whenever a shiftable driver brake force transmission component is shifted linearly, cause the magnet to rotate, thereby inducing an induction voltage to be generated in the stationary coil in response to a relative motion between the magnet and the stationary coil due to the rotation of the magnet; and
        an output device that is configured to output, to the brake system component, the induction voltage or a wake-up signal generated based on the induction voltage, thereby controlling the brake system component to transition from a first energy use mode to a second energy use mode that deviates from the first energy use mode.

8. A method for exciting a brake system component of a vehicle brake system that includes (a) a brake booster, (b) a motor that includes a rotor, and (c) a wake-up device that includes a rotor position sensor, the method comprising:
    generating, by the wake-up device, an induction voltage; and
    outputting, by the wake-up device, the induction voltage or a wake-up signal generated based on the induction voltage, thereby controlling the brake system component to transition from a first energy use mode to a second energy use mode that deviates from the first energy use mode;
    wherein:
        the rotor position sensor includes:
            a stationary coil; and
            a magnet by which the rotor position sensor is configured to detect a position of the rotor;
        the rotor position sensor configured to output an indication of the rotor position detected using the magnet;
        the rotor of the motor is configured to drive the brake booster without being influenced by the magnet and without being influenced by the stationary coil; and
        the brake system includes a transmission device arranged to, whenever a shiftable driver brake force transmission component is shifted linearly, cause the magnet to rotate, thereby inducing the induction voltage to be generated in the stationary coil in response to a relative motion between the magnet and the stationary coil due to the rotation of the magnet.

9. The method of claim 8, wherein the magnet is a permanent magnet of the rotor position sensor.

10. The brake system of claim 1, wherein the brake system component includes an Electronic Stability Program (ESP) device.

11. The brake system of claim 1, wherein the brake system component includes a plunger device.

12. The brake system of claim 1, wherein the brake system component includes an electrical power steering system.

13. The brake system of claim 1, wherein the brake system component includes a Controller Area Network (CAN) network.

14. The brake system of claim 1, wherein the brake system component includes a boost network.

15. A brake system of a vehicle, the brake system comprising:
- a brake booster;
- a motor that includes a rotor;
- a rotor position sensor that includes:
  - a magnet by which the rotor position sensor is configured to detect a position of the rotor, wherein the rotor position sensor is configured to output an indication of the rotor position detected using the magnet; and
  - a stationary coil, wherein the rotor of the motor is configured to drive the brake booster without being influenced by the magnet and without being influenced by the stationary coil;
- a transmission device arranged to, whenever a shiftable driver brake force transmission component is shifted linearly, cause the magnet to rotate, thereby inducing an induction voltage to be generated in the stationary coil in response to a relative motion between the magnet and the stationary coil due to the rotation of the magnet; and
- an output device that is configured to output, to the brake booster, the induction voltage or a wake-up signal generated based on the induction voltage, thereby controlling the brake booster to transition from a first energy use mode to a second energy use mode that deviates from the first energy use mode.

* * * * *